(12) United States Patent
Hernandez

(10) Patent No.: US 6,287,239 B1
(45) Date of Patent: Sep. 11, 2001

(54) METHOD OF EXERCISE USING A SPINNING CYCLE

(76) Inventor: Fernando J. Hernandez, 326½ N. Sycamore, Los Angeles, CA (US) 90036

( * ) Notice: Subject to any disclaimer, the term of this patent is extended or adjusted under 35 U.S.C. 154(b) by 0 days.

(21) Appl. No.: 09/560,290

(22) Filed: Apr. 27, 2000

(51) Int. Cl.[7] .................................................. A63B 21/00

(52) U.S. Cl. .................................. 482/1; 482/8; 482/54; 482/902

(58) Field of Search .............................. 482/1–9, 51, 54, 482/900–902

(56) References Cited

U.S. PATENT DOCUMENTS 6,027,428 * 2/2000 Thomas et al. .......................... 482/4

* cited by examiner

Primary Examiner—Glenn E. Richman
(74) Attorney, Agent, or Firm—Gary D. Schnittgrund; Law Offices of Gary Schnittgrund

(57) ABSTRACT

This invention is a method of exercise consisting of a spinning cycle having a flywheel and a display screen wherein a receptacle receives and runs a cartridge. The exerciser uses headphones to listen to both music and exercise directions while looking at a display screen wherein several messages are display, such as body position legend for the exerciser, a body position icon indicating the exerciser's preferred posture, music credits, cover notes, a posture reminder, and an exercise title.

18 Claims, 1 Drawing Sheet

METHOD OF EXERCISE USING A SPINNING CYCLE

BACKGROUND OF THE INVENTION

1. Field of the Invention

This invention relates to a method of exercise, utilizing an audio-visual device incorporated into the body of a stationary bicycle (specifically a "spinning" cycle) which instructs the user (through graphics and text) on proper body positioning, and leads the user through the "ride".

2. Description of the Related Art Including Information disclosed under 37 CFR Secs. 1.97–1.99.

Every day, more and more people are recognizing the benefits of including some sort of aerobic exercise into their lifestyle. Many choose to join health clubs, in order to take advantage of the various instructional classes offered, such as step aerobics, kickboxing or "Spinning". Of the aerobic classes offered, most avid gym goers would agree that the best way to get an intense and exhilarating workout is through "Spinning".

"Spinning" is a cycling class, led by an instructor, during which riders (each on their own stationary "Spinning" cycle) are taken through a very intense workout that includes various positions on the bicycle, such as "climbing" (cycling while standing), "jumping" (alternately sitting and standing, for a period of time), and "free-wheeling" (cycling at a very fast pace). All of the requlisite positions and exercises are possible due to the physical construction of the "Spinning" cycle, which differs from standard stationary bicycles, in that it contains a 45-pound "flywheel" which allows for manual resistance control and for constant resistance. Thus, the user may stand or sit on the cycle, without having the pedals "give way", as they would with a stationary cycle.

The ability to get a smooth and intense ride has made "Spinning" a very popular class. Yet, if one happens to miss any of the scheduled rides provided at the gym (either because the class is full, due to a limited amount of cycles, or due to personal scheduling conflicts), there is presently no other way to get a similar aerobic workout. One is relegated to the standard stationary bikes that do not allow for a smooth ride while "climbing", "jumping", or "free-wheeling".

Gymnasiums with "spinning" cycles typically do not allow the cycles to be used without a qualified instructor. This invention solves the problem by allowing a rider to get the full benefit of a "spinning" workout by utilizing, an interchangeable cartridge with appropriate instruction and music at any time. One no longer would need to be present at a class to derive the benefit of a "spinning" workout.

SUMMARY OF THE INVENTION

The method of exercise is designed to allow a solo exerciser to derive the full benefit of a "spinning" cycle aerobic workout by offering appropriate instruction with suitable music at any time the "spinning" cycle is available and the rider is desirous of a workout. The invention uses a spinning cycle with a display screen with cartridge that plays music for the exerciser and gives tile exerciser directions, while exercise directions, body position of the exerciser, music credits, elapsed time, and other information is displayed for the exerciser.

BRIEF DESCRIPTION OF THE DRAWINGS

The FIGURE illustrates a perspective view of the spinning cycle apparatus with its integral flywheel and audio-visual apparatus display screen fixed centrally of the handle bar wherein a receptacle receives and runs a cartridge which provides both auditory and visual directions for the exerciser.

DETAILED DESCRIPTION OF THE PREFERRED EMBODIMENT

Figure 1:
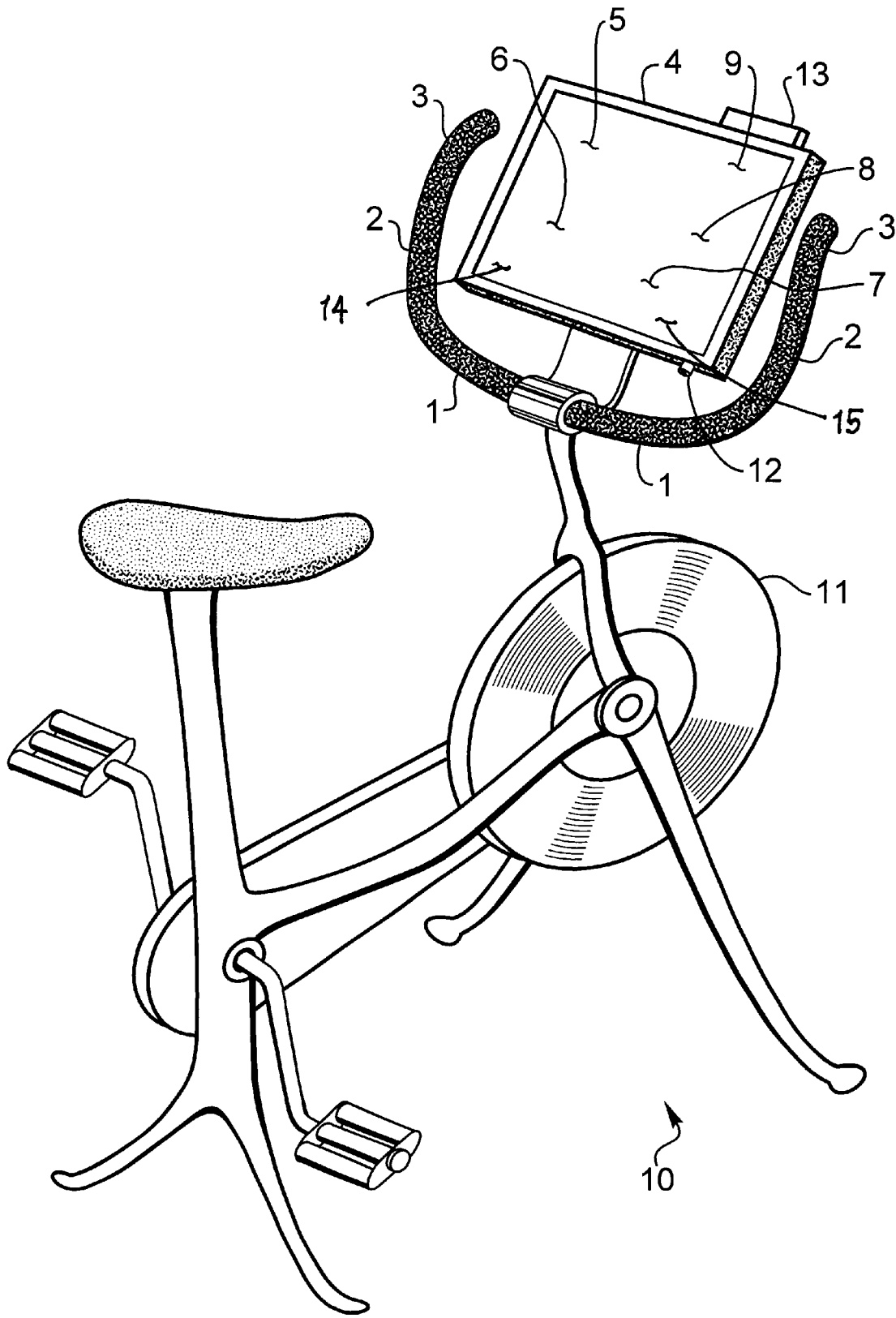

Adverting to the FIGURE, a method of exercise uses the apparatus generally indicated 10, consisting of a spinning cycle having, a flywheel 11 and a display screen 4 wherein a receptacle receives and runs a cartridge 13. In a preferred embodiment the display screen 4 may display several messages and icons, such as a body position legend 5, a body position icon 6 indicating the exerciser's posture, music credits and cover notes 7, a posture reminder 8, time remaining 14, pedaling rate 15, and an exercise title 9.

Even though in the preferred embodiment a cartridge is used, an alternative is a digital video device or DVD, compact disk, videotape cassette, videodisk, pocket or mini-ROM, or a computer.

A preferred method of exercise using the spinning cycle comprises the steps of;

1) mounting a spinning cycle,
2) inserting cartridge 13 in the receptacle,
3) selecting the training regiment on the programmed set of instruction to be followed for the exercise session,
4) doffing earphones (not shown) and inserting a plug in earphone jack 12,
5) assuming the posture written in legend 5,
6) assuming the posture shown graphically at 6,
7) observing the recommended rate written in legend 15 on the display and adjusting the pedaling rate of the exerciser to the recommended rate,
8) pedaling at the rate shown on screen 4,
9) listening to the music and moving the pedals in tempo to the music,
10) observing the time retaining in legend 14, and,
11) repeating( a prearranged sequence of steps 5, 6, 7, 8, 9, and 10 until the exercise ends.

Posture, according to the type of exercise predetermined by cartridge 13, may change with the exercise, and may change during an exercise, wherein hands are moved to a sequence of hand positions indicated low 1, medium 2, and high 3 on the handlebars. An exercise may require temporarily raising the body from the seat for a prescribed interval, which may be graphically indicated at 6 on screen 4.

A preferred variant of the method further includes a combination of instructions, urgings, and encouragement as audio overbids on cartridge 13.

Another preferred variant of the method requires a sequence of different levels of effort by the exerciser activating, as instructed in cartridge 13, changes in the energy of the flywheel 11.

The preferred method of exercise may include a combination of the previously described method elements.

What is claimed is:

1. A method of exercise comprising:

(a) mounting a spinning cycle having a set of pedals connected to a flywheel, a video screen, a video player, and an audio player (headphones), (b) selecting the training regiment with an appropriate instruction and music for the exercise session, (c) inserting, a programmed set of instructions with music into a video player attached to the spinning cycle, (d) doffing a set of headphones, (e) observing the body position icon on the screen and assuming that body position on the spinning cycle, (f) observing the posture icon on the screen and adjusting posture to that shown, (g) observing tile pedaling rate and adjusting the rate of the exerciser to the icon rate, (h) listening to the music and moving the pedals in tempo to the music, (i) following the instructions to stand, sit, chalice rate or position, change hand location, adjust resistance on the flywheel, (j) observing the remaining time on the video screen, (k) exercising during the length of the music and stopping, when the music stops or the instruction says to stop, (i) going on to the next exercise following instructions for steps e–k until instructed to stop or the music ends.

2. An audio-visual apparatus display screen fixed centrally of the handle bar of a spinning cycle, wherein a receptacle receives and runs a cartridge which provides both auditory and visual directions for the exerciser.

3. The audio-visual apparatus display screen of claim 2, wherein the audio-visual device displays a body position legend, a body position icon, music credits and cover notes, a posture reminder, a pedaling rate, and an exercise title.

4. A spinning cycle exercise bike comprising:

a spinning bike, a means for adjusting the resistance of the flywheel, a display screen, a means for producing an icon image on tile screen, a means for selecting an exercise regiment for the individual, a clock for timing the exercise, a means for indicating when the exerciser is finished with the exercise, a means for playing music.

5. The spinning cycle of claim 4, wherein the means for producing the icon image is a cartridge.

6. The spinining cycle of claim 4, wherein the means for producing the icon image is a DVD.

7. The spinning cycle of claim 4, wherein the means for producing the icon image is a compact disk.

8. The spinning cycle of claim 4, wherein the mean for producing the icon image is a pocket or mini-ROM disk.

9. The spinning cycle of claim 4, wherein the means for producing the icon image is a videodisk.

10. The spinning cycle of claim 4, wherein the means for producing the icon image is a computer.

11. The spinning cycle of claim 4, wherein the means for producing music is a cartridge.

12. The spinning cycle of claim 4, wherein the means for producing music is a digital video device or DVD.

13. The spinning cycle of claim 4, wherein the means for producing the icon image is a videotape cassette.

14. The spinning cycle of claim 4, wherein the means for producing music is a compact disk.

15. The spinning cycle of claim 4, wherein the means for producing music is a pocket or mini-ROM disk.

16. The spinning cycle of claim 4, wherein the means for producing music is a videodisk.

17. Tie spinning cycle of claim 4, wherein the means for producing music is a computer.

18. The spinning cycle of claim 4, wherein the means for producing music is a videotape cassette.

* * * * *